United States Patent
Rodriguez et al.

(10) Patent No.: US 6,986,156 B1
(45) Date of Patent: Jan. 10, 2006

(54) SYSTEMS AND METHODS FOR ADAPTIVE SCHEDULING AND DYNAMIC BANDWIDTH RESOURCE ALLOCATION MANAGEMENT IN A DIGITAL BROADBAND DELIVERY SYSTEM

(75) Inventors: Arturo A. Rodriguez, Norcross, GA (US); Dean F. Jerding, Roswell, GA (US)

(73) Assignee: Scientific Atlanta, Inc, Lawrenceville, GA (US)

( * ) Notice: Subject to any disclaimer, the term of this patent is extended or adjusted under 35 U.S.C. 154(b) by 173 days.

(21) Appl. No.: 09/590,521

(22) Filed: Jun. 9, 2000

Related U.S. Application Data (60) Provisional application No. 60/170,302, filed on Dec. 13, 1999, and provisional application No. 60/138,756, filed on Jun. 11, 1999.

(51) Int. Cl.
*H04N 7/173* (2006.01)

(52) U.S. Cl. .............................. 725/95; 725/97; 725/101
(58) Field of Classification Search .................. 725/97, 725/95, 96, 91, 86, 87, 101, 103, 104, 100, 725/45, 46, 47; 370/229, 230, 235, 237, 238; 375/240, 240.01, 240.15; H04N 7/175, 5/445; G06F 3/00, 13/00; H04B 1/66
See application file for complete search history.

(56) References Cited

U.S. PATENT DOCUMENTS

| | | | | | |
|---|---|---|---|---|---|
| 5,410,344 A | * | 4/1995 | Graves et al. | ................. | 725/46 |
| 5,682,597 A | * | 10/1997 | Ganek et al. | ................ | 725/101 |
| 5,771,435 A | * | 6/1998 | Brown | ......................... | 725/87 |
| 5,835,843 A | * | 11/1998 | Haddad | ....................... | 725/115 |
| 5,917,822 A | * | 6/1999 | Lyles et al. | ................. | 370/395 |
| 5,943,047 A | * | 8/1999 | Suzuki | ......................... | 725/116 |
| 5,990,927 A | * | 11/1999 | Hendricks et al. | .......... | 725/132 |
| 6,035,281 A | * | 3/2000 | Crosskey et al. | ............. | 705/14 |
| 6,057,872 A | * | 5/2000 | Candelore | ..................... | 725/23 |
| 6,108,002 A | * | 8/2000 | Ishizaki | ....................... | 709/217 |
| 6,118,976 A | * | 9/2000 | Arias et al. | .................. | 725/118 |
| 6,253,375 B1 | * | 6/2001 | Gordon et al. | ................ | 725/88 |
| 6,401,243 B1 | * | 6/2002 | Suzuki | ......................... | 725/86 |
| 6,543,053 B1 | * | 4/2003 | Li et al. | ....................... | 725/88 |

* cited by examiner

*Primary Examiner*—Vivek Srivastava (57) ABSTRACT

A technique for allocating bandwidth in a digital broadband delivery system (DBDS) using a bandwidth allocation manager to dynamically assign a content delivery mode to a plurality of digital transmission channels based on an allocation criteria received from a subscriber is disclosed herein. The bandwidth allocation manager determines a bandwidth allocation schedule for a predetermined bandwidth based on allocation criteria comprising a criteria received from a subscriber. The allocation criteria received from the subscriber may comprise a subscriber reservation request which is processed by the bandwidth allocation manager to determine the bandwidth allocation schedule.

17 Claims, 4 Drawing Sheets

SYSTEMS AND METHODS FOR ADAPTIVE SCHEDULING AND DYNAMIC BANDWIDTH RESOURCE ALLOCATION MANAGEMENT IN A DIGITAL BROADBAND DELIVERY SYSTEM

RELATED APPLICATIONS

This application claims priority to U.S. Provisional Application No. 60/138,756, filed Jun. 11, 1999, entitled "Method and Apparatus for Providing Video-On-Demand Services in a Digital Subscriber Television System" and to U.S. Provisional Application No. 60/170,302, filed Dec. 13, 1999, entitled "Home Communications Terminal Resident Application".

TECHNICAL FIELD

The present invention relates to digital broadband delivery systems. More particularly, the invention relates to management of bandwidth allocation in a digital broadband delivery system.

BACKGROUND

Over the past twenty years there has been a dramatic and continual increase in the number and types of television programming available to television viewers. Traditional delivery systems, such as broadcast television, however, are limited in that the programming provided is temporally fixed—that is a viewer must tune into a particular broadcast at the time when it is shown. Although traditional delivery models have the advantage of allowing virtually unlimited increases in audience size, these models are inconvenient because they do not allow television viewers to alter the broadcast pattern to comport to their own viewing patterns.

For many years now, attempts have been made to develop new delivery systems that provide users with more control over broadcast programming. Ideally, it should be possible for most viewers to obtain access to particular content at the time of their choosing, notwithstanding the time of day or the number of other viewers simultaneously requesting access. It is also desirable for each viewer to have the ability to perform random-access operations on the program such as Play, Pause, Fast Forward, Rewind, Stop, and Resume Play as in a conventional Video Cassette Recorder. This delivery model is known as true "video-on-demand" (VOD). The problem with implementing a true VOD system is that the most intuitively simple solution in which a central service provides a separate transmission of a program to individual subscribers upon their requests, requires duplication of equipment and substantial bandwidth resources. Despite recent advances in video compression technology, there still exists a limited amount of bandwidth that may be used to fulfill viewer demands. For this reason, numerous research efforts have been undertaken in an effort to simulate true VOD service by providing viewers with more options while minimizing the number of channels, and consequently the amount of bandwidth, used to broadcast any one program.

One solution is a technique known as "near video-on-demand" (NVOD). In this delivery system, programs that are in high demand are broadcast on multiple channels with a short, preset interval between the starting time of each program broadcast. For example, a two-hour movie may be broadcast on seven consecutive channels with the starting broadcast time of each channel offset by fifteen minutes from that of a neighboring channel, such that the beginning of the movie is effectively available on one of the channels once every fifteen minutes. A problem with such NVOD systems is that the programs being broadcast are predetermined and are shown in temporally fixed intervals. As such, a viewer wishing to watch such programs must choose from among the available options without having any opportunity to influence either the selection of the program (i.e. the particular movie), the times at which it is broadcast, or the frequency of which the program is broadcast (the transmission interval).

Other delivery systems have attempted to alleviate some of the problems associated with traditional NVOD systems by altering the manner in which the programs are transmitted from the video server to each individual viewer. Examples of such systems are disclosed in U.S. Pat. No. 6,018,359, invented by Kermode, et al. entitled *System and method for multicast video-on-demand delivery system*; and U.S. Pat. No. 5,936,659, invented by Viswanathan, et al., entitled *Method for video delivery using pyramid broadcasting*.

In the Viswanathan method, each program is divided into segments of geometrically increasing size with the server transmission capacity evenly divided into a preset number of logical channels. Each channel broadcasts an assigned segment repeatedly, in an infinitely looping fashion. The viewer's receiver sequentially downloads the various video segments, playing back previously downloaded segments even as new segments are loaded. Playback commences as soon as the first segment is fully downloaded and since this segment is the shortest, the time period between receiving a view request and the time of playback is relatively short.

In the Kermode, et al. method, video files are divided into sequentially organized data segments. The Kermode method provides the advantage of allowing the data segments to be downloaded asynchronously, that is download of a new segment need not await the arrival of the initial (or previous) segment over the transmission channel. The length of the data segments is chosen so that a set number of channels are used efficiently and the receiver is capable of receiving data from no less than two channels. The received data is then reordered by the receiver prior to playback.

At least one of the problems associated with these types of systems is that they normally require a storage device or large amounts of memory at the receiver to enable program downloading and uninterrupted program view. Moreover, these systems afford little flexibility to the viewer in determining which programs are shown. Although these methods eliminate some of the problems with traditional delivery mechanisms, they do not alleviate the problem inherent in broadband delivery systems, i.e., limited bandwidth. Because broadband delivery systems must continue to offer conventional and emerging broadcast services and offer services at a cost attractive to consumers, they must manage channel usage effectively. Consequently, only a limited number of channels are available and only certain programs may be shown. Although these methods allow certain preselected programs to be requested and viewed almost immediately, only a limited number of programs can be offered at any one time. Because the programs offered must be determined ahead of time, viewers have no way to express which movies they prefer to see nor the capability to enact random access operations on the broadcast programming.

Thus, there is a need for a delivery system which includes a means for intelligent and efficient management of bandwidth allocation in a manner that makes optimal use of the available bandwidth and provides viewers with a greater degree of control over bandwidth allocation.

SUMMARY OF THE INVENTION

A bandwidth allocation manager for determining bandwidth allocation in a digital broadband delivery system according to the present invention dynamically assigns a content delivery mode to a plurality of digital transmission channels based on an allocation criteria comprising a subscriber criteria received from a subscriber. The content delivery mode may be any of several well-known delivery modes such as pay-per-view, video-on-demand, and near video-on-demand content delivery modes, or any combination or hybrid thereof.

The subscriber criteria received from the subscriber may, for example, comprise a video-on-demand request, a subscriber reservation request, a subscriber profile, or a subscriber priority. In addition to the subscriber criteria, the allocation criteria may also comprise a priority assigned by a bandwidth allocation manager. According to one aspect of the present invention, the bandwidth allocation manager processes a plurality of allocation criteria according to a predetermined statistical model to determine a bandwidth allocation schedule and/or delivery mode.

According to another aspect of the present invention, a bandwidth allocation system is disclosed wherein the bandwidth allocation system comprises a bandwidth allocation manager, a network manager, and a video-on-demand (VOD) application server. The bandwidth allocation manager dynamically determines a bandwidth allocation schedule for a predetermined bandwidth based on allocation criteria by assigning a content delivery mode to a plurality of digital transmission channels, wherein the allocation criteria comprises a subscriber criteria received from a subscriber. The network manager is in communication with the bandwidth allocation manager and the network manager allocates bandwidth in the digital broadband delivery system. The VOD application server is in communication with the bandwidth allocation manager and transmits a list of available content delivery modes to the bandwidth allocation manager.

According to another aspect of the present invention, the bandwidth allocation system may also comprise a digital home communication terminal (DHCT) in communication with the bandwidth allocation manager, wherein the digital home communication terminal transmits subscriber criteria to the bandwidth allocation manager. The digital home communication terminal may also receive channel allocation information from the bandwidth allocation manager and display the information to the subscriber. According to another aspect of the present invention, the bandwidth allocation manager determines a content delivery schedule wherein instances of the same video content are transmitted with different starting times spaced at intervals of varying length.

In an embodiment of the present invention, a method for allocating bandwidth based on allocation criteria using a bandwidth allocation manager is disclosed. The method comprises initiating a bandwidth allocation event, receiving a subscriber criteria from a subscriber, and dynamically determining a bandwidth allocation schedule for a predetermined bandwidth based on the subscriber criteria. The bandwidth allocation manager may also communicate with the network manager and DHCT to dynamically assign a content delivery mode to a plurality of digital transmission channels on a real-time basis. The content delivery mode and time may comprise broadcasting instances of the same video content at predetermined times separated by intervals of varying length.

Advantageously, the present invention enables bandwidth to be flexibly and efficiently allocated in a digital broadband delivery system based at least in part on subscriber preferences. In addition, the present invention allows subscribers to request that bandwidth be reserved for use in the future. The present invention also allows bandwidth to be dynamically allocated on a real-time basis by adaptively invoking one or more of a multiplicity of bandwidth allocation schemes employing one or more content delivery modes.

Other features and advantages of the present invention will become apparent to one skilled in the art upon examination of the following drawings and detailed description. It is intended that all such features and advantages be included herein within the scope of the present invention as defined by the appended claims.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Digital Broadband Delivery Systems

Figure 1:
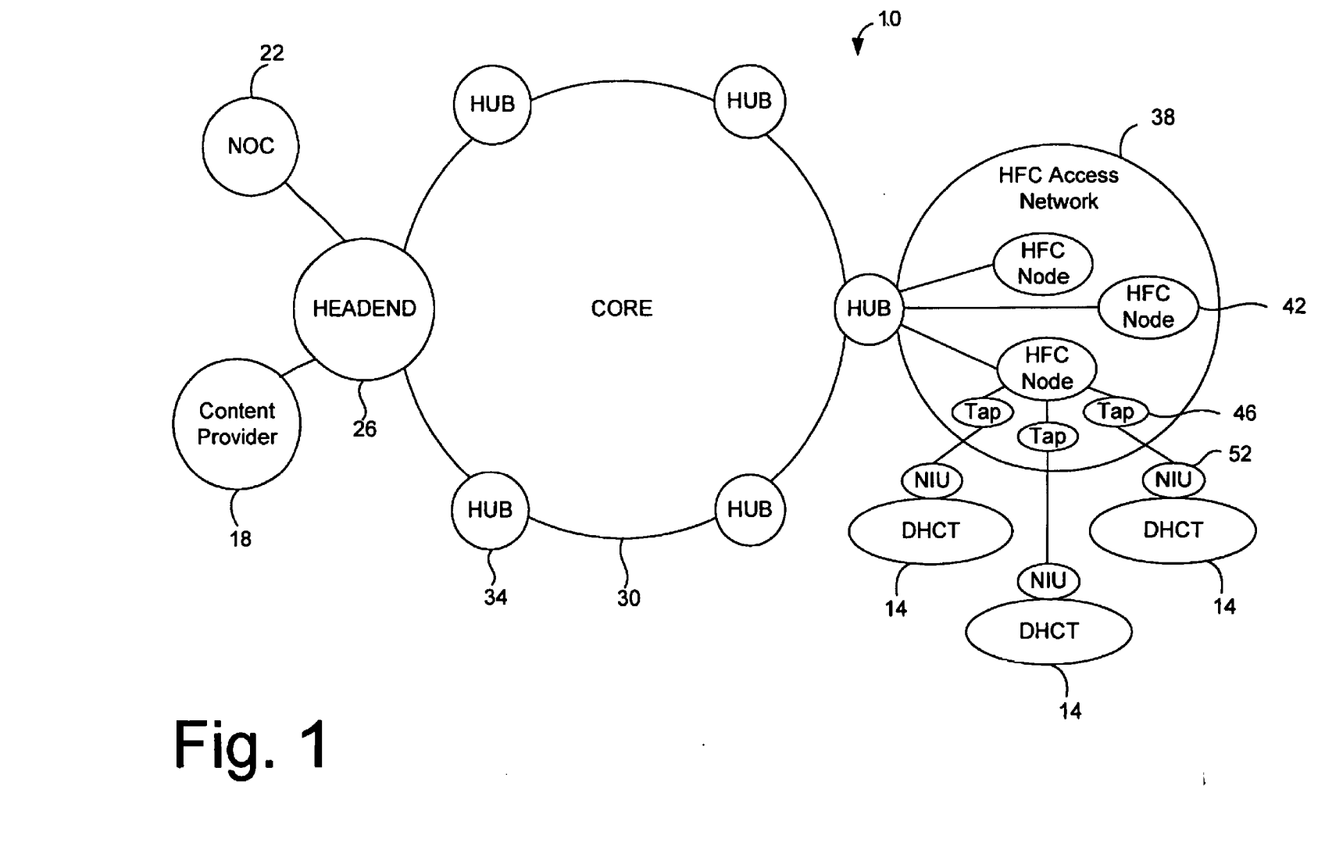
FIG. 1 is a block diagram of a Digital Broadband Delivery System (DBDS) in accordance with an aspect of the invention.

The present invention is generally implemented as part of a Digital Broadband Delivery System (DBDS). Hence, an illustrative DBDS and its operation will be described initially. FIG. 1 shows a block diagram view of a DBDS 10, which is generally a high quality, reliable and integrated network system that features video, audio, voice and data services to Cable TV subscribers. Although FIG. 1 depicts a high level view of a DBDS including a regional hybrid/fiber coax (HFC) access network 38, as will be described below, it should be appreciated that a plurality of DBDSs can tie together a plurality of regional networks into an integrated global network so that Cable TV subscribers can receive content provided from anywhere in the world. The DBDS 10 shown in FIG. 1 delivers broadcast video signals as digitally formatted signals in addition to delivering traditional broadcast analog video signals. Furthermore, the system can support one way broadcast services as well as both one-way data services and two-way media and data services. The two-way operation of the network allows for subscriber interactivity with services, such as Pay-Per-View programming, Near Video-On-Demand (NVOD) programming according to any of several known NVOD implementation methods, View-on-Demand (VOD) programming (according to any of several known VOD implementation methods), and interactive applications, such as Internet connections and Electronic Program Guide (EPG) applications.

The DBDS 10 provides the interfaces, network control, transport control, session control, and servers to access content and services, and distributes content and services to Cable TV subscribers. As shown in FIG. 1, a typical DBDS 10 is composed of interfaces to content providers 18, network operations centers (NOC) 22, core networks 30 of headends 26, hubs 34, HFC access networks 38, and subscribers' digital home communication terminals (DHCTs) 14. It should be appreciated that although single components (e.g., headend 26, core network 30, HFC access network 38, etc.) are illustrated in FIG. 1, a DBDS 10 can feature a plurality of any one of the illustrated components or may be configured with alternative embodiments for any one of the individual components or with yet other additional components not enumerated above.

The content provider 18 represents one or more providers of content, such as video channels, music channels, data channels, video services, audio services and data services. For example, the content provider 18 could comprise a video/audio media provider or an Internet service provider (ISP) providing data to the system to enable subscribers web access or web-enhanced video via the subscriber's television set. The content provider 18 transmits the content to a headend 26 for further transmission to subscribers downstream in the network. Also in communication with the headend 26 is a network operation center (NOC) 22, which is an external management center interfaced with DBDS 10 to allow for the remote operation of the system.

Content provided by the content provider 18 is communicated by the content provider 18 to one or more headends 26. From those headends 26 the content is then communicated to the core network 30 of hubs 34 and onto a plurality of HFC access networks (only one HFC access network 38 is illustrated). The HFC access network 38 typically comprises a plurality of HFC nodes 42, each of which may service a local geographical area. The content provided from the content provider 18 is transmitted through the headend 26, hub 34 and HFC access network 38 downstream to one or more taps 46 from each one of the HFC nodes 42 of the HFC access network 38. The hub 34 connects to the HFC node 42 through the fiber portion of the HFC access network 38. Usually, the HFC node 42 connects to a subscriber's DHCT 14 through coaxial cable in a logical tree configuration, which is where the optical-to-electrical and electrical-to-optical conversations of the HFC network take place. From the HFC node 42 a coaxial drop connects the tap 46 to a network interface unit (NIU) 52, which is a network demarcation point normally located on the side of the subscribers' homes. The NIU 52 provides a transparent interface between the HFC node 42 and the subscribers' internal wiring. Coaxial cables are preferred in this part of the system because the electrical signals can be easily repeated with radio frequency (RF) amplifiers. Typically, six amplifiers or less are located in series between the HFC node 42 and the subscribers' DHCTs 14.

Figure 2:
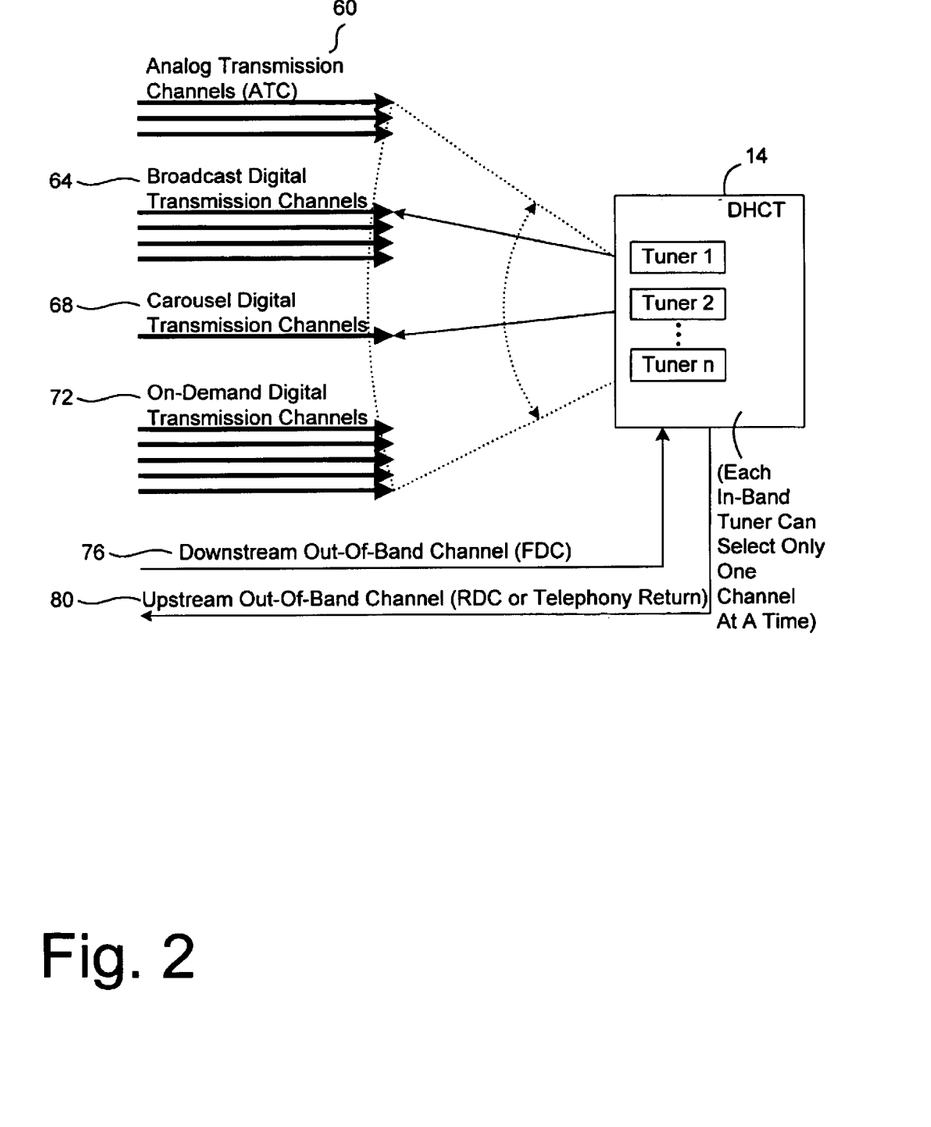
FIG. 2 is a schematic illustration of the input channels supported by a DBDS and the input of these channels into a digital home communication terminal (DHCT) according to one aspect of the invention.

As the high-level operation of DBDSs is well known to those of skill in the art, further description of the overall DBDS 10 of FIG. 1 will not be contained herein. It will be appreciated, however, that the DBDS shown in FIG. 1 is merely illustrative and should not be construed as implying any limitations upon the scope of the present invention. Because the form and content provided to the subscribers DCHT 14 by the DBDS 10 is useful to understanding the purpose, operation and function of the present invention, the data provided by the DBDS to the DCHT will next be discussed with reference to FIG. 2. FIG. 2 shows illustrative channels supported by the DBDS, where the channels 60, 64, 68, 72 and 76 are input into a DHCT 14. The content contained in these input channels is mostly provided by the one or more content providers 18 illustrated in FIG. 1. A portion of the content may be generated at a headend 26 or at a hub 34 that might function as a mini-headend and thus possesses some of the headend functionality.

As depicted in FIG. 2, the DBDS 10 can simultaneously support a number of transport channel types and modulation formats. Although not shown in FIG. 2, the DBDS 10 may also support multiple in-band tuners. The ability to carry analog and digital signals over a large bandwidth are characteristics of an HFC network typically employed in a DBDS, as in the DBDS 10 of FIG. 1. As will be appreciated by those of skill in the art, analog and digital signals in HFC networks can be multiplexed using frequency division multiplexing (FDM), which enables many different types of signals to be transmitted over the DBDS 10 to the DHCT 14. Typically, a DBDS using HFC supports downstream (i.e., in the direction from the headend to the DHCT) frequencies from 50 MHz to 870 MHz, whereas upstream frequencies (i.e., in the direction from the DHCT to higher levels of the system) are in the 5 MHz to 42 MHz band. Generally, the RF channel bandwidth spacing for analog and digital services is 6 MHz. Furthermore, for a 870 MHz system in the U.S., a possible downstream RF spectrum subdivision plan uses 6 MHz spaced RF channels within the 50 MHz to 550 MHz band for analog video carriers and within the 550 MHz to 870 MHz range for digital carriers. It will be appreciated, however, that the present invention may also be implemented on other HFC networks that employ other subdivision plans.

Referring again to FIG. 2, the downstream direction channels, having been multiplexed using FDM, and often referred to as in-band channels, include Analog Transmission Channels (ATCs) 60 and Digital Transmission Channels (DTCs) 64, 68, 72 (also known as Digital Transport Channels). These channels carry video, audio and data services. For example, these channels may carry television signals, internet data, or any additional types of data such as EPG data and VOD Catalog data. VOD Catalog data may comprise information such as program titles, respective program descriptions, program attributes and characteristics, or other similar data or descriptors as found in the electronic program data. The signals and data carried on these channels are collectively referred to herein as services. The ATCs 60 shown in FIG. 2 are typically broadcast in 6 MHz RF channels having an analog broadcast composed of analog video and analog audio, and include Broadcast TV Systems Committee (BTSC) stereo and Secondary Audio Program (SAP) audio. Additionally, as will be appreciated by those of skill in the art, additional data, such as EPG and VOD Catalog information, can be sent with the analog video image in the Vertical Blanking Interval (VBI) of the video signal.

Like the ATCs 60, the DTCs 64, 68, 72 each typically occupy 6 MHz of the RF spectrum. However, the DTCs 64, 68, 72 are digital channels typically consisting of 64- or 256-Quadrature Amplitude Modulated (QAM) digital signals formatted as MPEG-2 transport streams, and allocated in a separate frequency range. As will be described in more detail below, the MPEG-2 transport stream enables transmission of a plurality of DTC types over each 6 MHz RF spacing. The three types of digital transport channels illustrated in FIG. 2 include broadcast digital transmission channels 64, carousel digital transmission channels 68, and on-demand transmission channels 72.

MPEG-2 transport may be used to multiplex video, audio, and data in each of these DTCs. However, because MPEG-2 transport streams allow for multiplexing video, audio, and data into the stream, the DTCs do not necessarily have to be allocated in separate 6 MHz RF frequencies, unlike ATCs 60. Each DTC is capable of carrying multiple broadcast digital video programs, multiple cycling data carousels containing broadcast data, and data requested on-demand by the subscriber. Data is formatted, such as in Internet Protocol (IP), mapped into MPEG-2 packets, and inserted into the multiplexed MPEG-2 transport streams. Encryption techniques can be applied to the data stream as applicable for security so that the multiplexed data may be received only by authorized DHCTs. For example, one individual subscriber may be authorized to receive certain broadcast and/or on-demand data, while others may be authorized to receive additional and/or different broadcast or on-demand data according to a predetermined or aggregate service fee or a volatile service fee structure. Therefore, additional subscribers in the same local area not authorized to view selected transmission channels will not be able to do so. It will be appreciated that each 6 MHz RF spacing assigned as a digital transmission channel can carry the video and audio streams of the programs of multiple television (TV) channels, as well as media and data that is not necessarily related to those TV programs or TV channels, as compared to one TV channel broadcast over one ATC 60 that consumes the entire 6 MHz. The digital data is inserted into MPEG transport streams for each 6 MHz RF channel assigned for digital transmission, and then de-multiplexed at the subscribers' DHCT so that multiple sets of data can be produced within each tuned 6 MHz frequency span.

Continuing with FIG. 2, the broadcast DTCs 64 and carousel DTCs 68 typically function as continuous feeds for indefinite time, whereas the on-demand DTCs 72 are typically continuous feed sessions for a limited time. All DTC types are capable of being transmitted at high data rates. The broadcast DTCs 64 carry typical data comprising multiple digitally-MPEG-2 compressed and formatted TV channels and other continuously fed data information. The carousel DTCs 68 typically carry high-volume broadcast data, such as EPG data, VOD Catalog data and program data, that is systematically updated and revised. Typically, the carousel DTCs 68 also carry data formatted in directories and files by a Broadcast File System (BFS), which is used for producing and transmitting data streams throughout the DBDS, and which provides an efficient means for the delivery of application executables and application data to the DHCT. The on-demand DTCs 72, on the other hand, can carry particular information such as compressed video and audio pertaining to subscriber requested video services, program previews, and program descriptions, as well as other specialized data information.

Although broadcast in nature, the carousel DTCs 68 and on-demand DTCs 72 offer different functionality. The User-to-Network Download Protocol of the MPEG-2 standard's DSM-CC specification (Digital Storage Media—Command and Control) provides the data carousel protocol used for broadcasting data from a Server located at headend 26. It also provides the interactive download protocol for reliable downloading of data from a Server (possibly the same server) to an individual DHCT through the on-demand DTCs. Each carousel and on-demand DTC is defined by a DSM-CC session. Aspects of DSM-CC are described in U.S. Pat. No. 5,481,542, entitled *Interactive Information Services Control System*.

Also shown in FIG. 2 is a Out-Of-Band (OOB) channel that provides a continuously available two-way signaling path to the subscribers' DHCT 14 regardless of which in-band channels are tuned to by an individual DHCT in-band tuner. The DHCT 14 may also comprise multiple in-band tuners in which case the OOB channel complements the service of the set of in-band tuners. The OOB channel consists of a forward data channel (FDC) 76 and a reverse data channel (RDC) 80. The OOB channel can comply to any one of a number of well known transport protocols but preferably complies to either a DAVIC 1.1 Transport Protocol with FDC of 1.544 Mbps or more using QPSK modulation and an RDC of 1.544 Mbps or more using QPSK modulation, or to a DOCSIS Transport Protocol with FDC of 27 Mbps using 64-QAM modulation and a RDC of 1.544 Mbps or more using QPSK modulation or 16-QAM modulation. The OOB channels provide the two-way operation of the network, which allows a subscriber interactivity with the services provided by the network. Therefore, the DHCT 14 typically contains functionality similar to a networked computer (i.e., a computer without a persistent storage device) in addition to traditional set top box functionality, as is well known in the art. Furthermore, the OOB channels are not limited to a 6 MHz spectrum, but generally to a smaller spectrum, such as 1.5 or 3 MHz.

Figure 3:
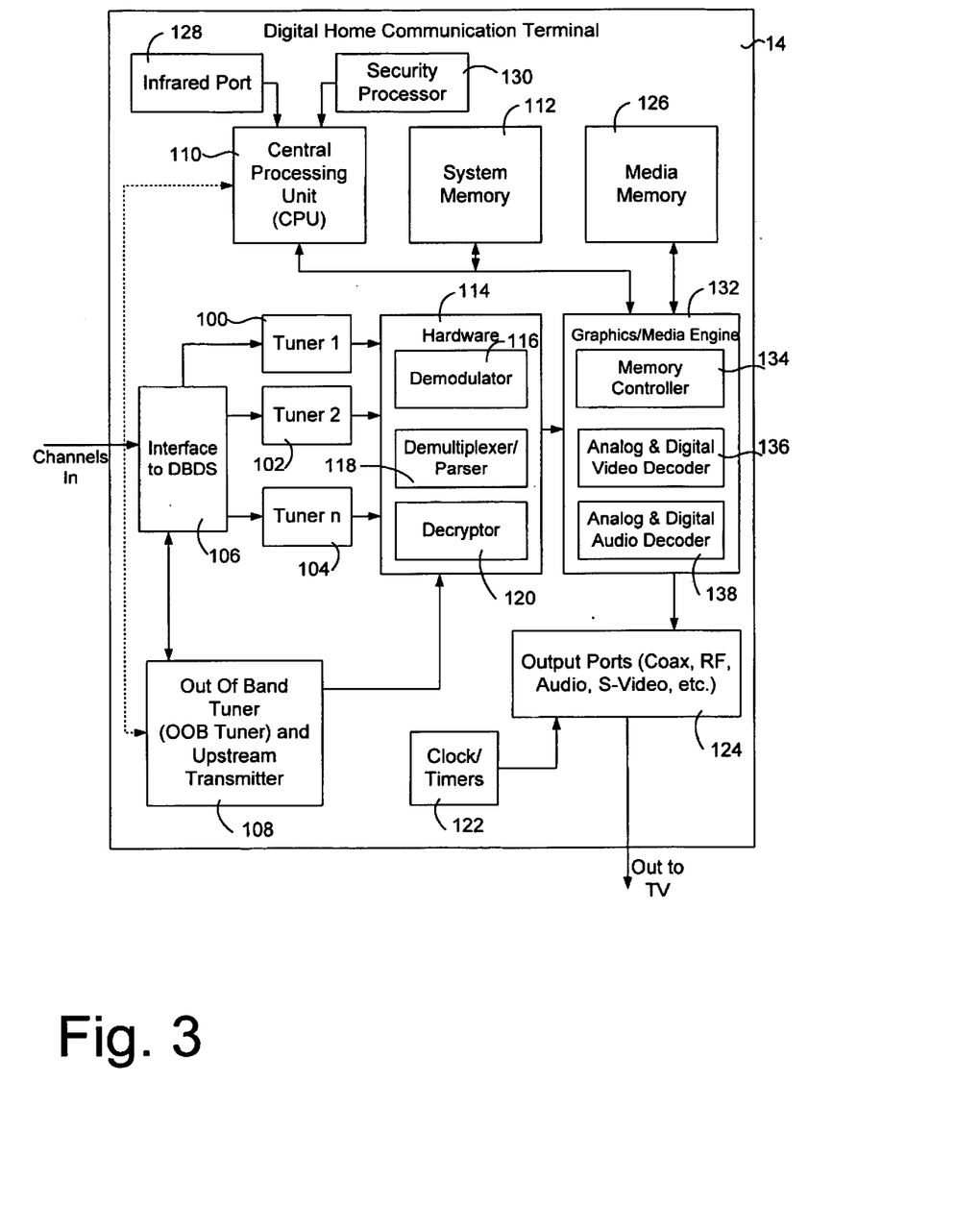
FIG. 3 is a block diagram of certain components to an exemplary DHCT suitable for operation as the DHCT of FIG. 2, according to one aspect of the present invention.

FIG. 3 is a block diagram showing the components comprising one possible configuration of a DHCT 14 according to the present invention. The DHCT 14 includes an interface to the DBDS 10 through which the DHCT 14 receives data from a plurality of analog or digital channels, including analog and digital broadcast TV programs and services, including video, audio and data, and even data channels such as DOCSIS cable modem channels. The DHCT 14 includes at least one tuner 100, and possibly additional multiple tuners 102, 104, preferably capable of receiving signals from an HFC Plant (e.g., an 870 MHz HFC Plant), and capable of analog and digital (64/256 QAM) tuning to a single RF channel from a multiplicity of spaced RF channels (e.g., 6 MHz spaced RF channels in the US, 8 MHz in Europe).

Also included within the DHCT 14 is an OOB tuner and upstream transmitter 108 that is connected to the interface of DBDS 10. It should be appreciated that although the OOB tuner and upstream transmitter are illustrated as one component in FIG. 3, the tuner and transmitter can be independent of each other and located separately within the DHCT 14. Nonetheless, both components should be in communication with the DBDS so that upstream transmissions can be received by the system. The OOB tuner and upstream transmitter 108 enables the DHCT 14 to interface with a DBDS network so that the DHCT 14 can provide upstream data to the network, for example, via a QPSK channel or a QAM channel. In this manner, a subscriber can interact with the DBDS to request services, such as Pay-Per-View programming, View-On-Demand programs, more comprehensive EPG data for desired programs, and data associated with VOD programs and services. Data associated with VOD programs and services may comprise data to populate the entries of a Video Catalogue that is presented to the subscriber via a Graphical-User-Interface (GUI) from which a subscriber selects and purchases movies, retrieves program information for the respective VOD movie titles, and from which the subscriber enters subscriber selection criteria and/or preferences. The VOD Catalogue data set may also comprise database records containing program information such as program showing times, program titles, program descriptions, program genres, program release years, casts lists, ratings information, cost and pricing information (or viewing service fees), program durations, and/or links to additional respective program related information such as a program previews and critic's reviews and comments. The effective window of calendar days in which a program is purchasable may also be included. As is described in more detail below, the VOD Catalogue data may also comprise one or more database records pertaining to variable fee structures for a particular program.

The DHCT 14 preferably includes an infrared receiver 128 for receiving externally-generated information such as subscriber input via an input device such as an Infrared (IR) remote control. The DHCT 14 may also include one or more wireless or wired communication interfaces, also called ports, for receiving and/or transmitting data to other devices. For instance, the DHCT may feature USB (Universal Serial Bus), Ethernet (for connection to a computer), IEEE-1394 (for connection to media devices in an entertainment center), serial, and/or parallel ports. The user inputs may, for example, be provided by a computer or transmitter with buttons or keys located either on the exterior of the terminal or by a hand-held remote control device or keyboard that includes user-actuated buttons. Signals generated by such input devices are received by a communication port or receiver in DHCT 14 and consequently interpreted by CPU 110 or other processor in DHCT 14 and passed as input data to the VOD software program residing in system memory 112.

The system memory 112 of the DHCT 14 includes flash memory and dynamic random access memory (DRAM) for storing the executable programs and related data components of various applications and modules for execution by the DHCT 14. Both the flash memory and the DRAM memory are coupled to the processor 110 for storing configuration data and operational parameters, such as commands that are recognized by the processor 110.

Basic program execution functionality within the DHCT 14 is provided by an operating system that resides in system memory 112. One or more programmed software applications, herein referred to as applications, are executed by utilizing the computing resources in the DHCT 14. Any application executable program stored in system memory 112 is executed by processor 110 (e.g., a central processing unit or digital signal processor) under the auspices of the operating system. Data required as input by the application program may be stored in system memory 112 and read by processor 110 from memory 112 as needed during the course of application program execution. Input data may also be data stored in memory 112 by a secondary application or other source, either internal or external to the DHCT 14, or possibly anticipated by the application and thus created with the application program at the time it was generated as a software application program, in which case it is stored in the flash memory part of system memory 112. Data may be received via any of the communication ports of the DHCT 14, from the headend 26 via the DHCT's network interface 106 (i.e., the in-band or out-of-band tuners) or as user input via receiver 128 or some other communication port. Data generated by the application programs is stored in system memory 112 by processor 110 during the course of application program execution.

Referring still to FIG. 3, a telephone modem in the DHCT 14 can be utilized for upstream data transmission and a headend 26 or hub 34 or other component located upstream in the DBDS can receive data from a telephone network coupled to a telephone modem and can route the upstream data to a destination internal or external to the DBDS. After the one or more tuners 100, 102, 104 select one or more transmission channels, incoming data is forwarded to hardware 114 comprising circuitry with capability for demodulating 116, demultiplexing and parsing 118, and decrypting 120 the incoming signals. More specifically, the hardware components 114 are capable, among other things, of QAM demodulation, Forward Error Correction (FEC), Parsing MPEG-2 Transport Streams, Packetized Elementary Streams and Elementary Streams, and Decryption, as is well known in the art, to counter the effect of signal processing of broadcast media and data in the DBDS. Particularly, such signal processing is performed at the headend 26 and in some cases it may be performed in part at the hubs 34. Although not illustrated in FIG. 3, additional components can be included within the hardware 114, such as descramblers, decoders, digitizers, signal amplifiers, and other circuitry for signal or error recovery.

Having generally described the makeup of one possible digital broadband delivery system, it serves to point out the limitations that are often inherent in such systems. Because a limited amount of bandwidth is available for transmitting services between the DBDS 10 and the DHCT 14, decisions must be made as to how to allocate the bandwidth available for such transmission. Initially, it must be determined how much bandwidth is to be allocated for DTC usage. As stated above, for a 870 MHz system in the U.S., a possible downstream RF spectrum subdivision plan uses 6 MHz spaced RF channels within the 50 MHz to 550 MHz band for ATCs. The 550 MHz to 870 MHz range is typically designated for DTC usage. Thus, in a typical subdivision plan, the available bandwidth for DTC usage is only 220 MHz. This bandwidth must be allocated between the Broadcast, Carousel, and On-Demand DTCs. Under conventional systems, this determination is made somewhat arbitrarily by assigning a predetermined portion of the available bandwidth to each type of DTC. The DTC content is then translated into MPEG-2 transport streams and transported in 6 MHz RF spaced channels.

For example, referring back to FIG. 1, if each HFC Node 42 serves five-hundred subscribers (represented by the DHCTs 14) and each hub 34 serves four HFC Nodes 42 for a total of two thousand total subscribers per hub, a cable operator may choose to allocate enough bandwidth to the On-demand DTCs to allow ten percent (10%) of the total number of subscribers to purchase a VOD service at the same time. Stated differently, only 200 out of the 2000 total subscribers can purchase a VOD service concurrently. To achieve this in a typical delivery scheme, the cable operator would need to allocate bandwidth equivalent to twenty 6 MHz RF channels solely for VOD services. Under this model, it is assumed that each 6 MHz RF channel modulated at 256 QAM can carry approximately 39.6 megabits of digitally compressed data per second. Under the assumption that most VOD services (such as a movie) can be transmitted at approximately 3.5 megabits per second, each channel can carry approximately 10 VOD services while still leaving residual bandwidth to transmit data such as data associated with VOD services (e.g., VOD Catalogue data as described above). By allocating twenty 6 MHz RF channels to VOD services, 200 movies may be simultaneously transmitted (thus enabling 200 subscribers to request VOD services).

It will be appreciated, however, that dedicating twenty 6 MHz RF channels to VOD services can consume a disproportionate percentage of the bandwidth available for DTC usage. For instance, in DBDSs that transmit DTCs within the 550 to 870 MHz frequency range, dedicating twenty channels consumes approximately 120 MHz of the available bandwidth, leaving only 100 MHz for broadcast and carousel DTC usage. Considering that very few of the twenty channels will actually be used concurrently during a multiplicity of different time periods, dedicating such a large percentage of the available bandwidth to VOD services is inefficient because a large percentage of the bandwidth is unused during those respective time periods. On the other hand, if during peak viewing periods more than 10% of the subscribers desire to purchase a VOD service, bandwidth allocated to the dedicated VOD channels will be insufficient. Therefore when the bandwidth capacity dedicated to VOD usage is fixed, as in the case when a predetermined number of 6 MHz RF channels are assigned and allocated for VOD services in advance, the DBDS will not be able to satisfy the demand during peak periods that surpass the assumed maximum number of simultaneous VOD service requests. In the foregoing example, this would transpire when the number of simultaneous VOD service requests surpasses a maximum of 200 VOD requests at any one time.

The remaining bandwidth may also be allocated inefficiently. Continuing with the above example, if 120 MHz of the available bandwidth is dedicated to VOD services, then the remaining 100 MHz can be divided between Broadcast DTCs and Carousel DTCs. Bandwidth allocation can be designed, for instance, with a delivery scheme that allocates approximately two to four 6 MHz RF channels for high volume data transmission such as electronic program guide data and internet data. Each of these high volume data channels may have one or more Carousel DTCs and a portion of each these 6 MHz RF channels may also have a percentage of the bandwidth allocated for on-demand data such as data that augments the data found in the VOD Catalogue. The remaining twelve to fourteen 6 MHz RF channels may then be reserved for Broadcast DTC services.

As discussed above, it will be appreciated that the carousel, broadcast, and on-demand DTCs may be multiplexed and transmitted over the same RF channel. The above example merely assumes that the equivalent of two to four 6 MHz RF channels are dedicated to high volume data usage with the remainder being allocated to broadcast DTCs. In reality, all three types of DTCs may be multiplexed and transmitted in MPEG-2 transport streams over a single 6 MHz spaced RF channel.

A portion of the bandwidth allocated for broadcast DTC usage in a typical DBDS is used for pay-per-view services wherein video content is broadcast continuously at preset scheduled intervals. These channels may also be used to partially simulate VOD-type functionality, in particular, random access features such as "pause" and "play," by continually broadcasting video content according to any of several NVOD delivery schemes well-known in the art, some of which are discussed above. Such schemes, however, are typically inefficient because the bandwidth dedicated to NVOD and pay-per-view services is predetermined without taking subscriber preferences into account or giving the subscriber the opportunity to influence the allocation of the available bandwidth. Because the amount of bandwidth that can be allocated is finite, the number of movies that can be transmitted at any one time according to these content delivery modes is also limited. Thus, only certain movies can be broadcast according to the NVOD or pay-per-view models. If the majority of subscribers do not desire to view the pre-selected services, the bandwidth allocated to these services is essentially wasted because subscribers aren't tuning into the services. Furthermore, because a certain number of subscribers must view pre-selected services for profitability of pre-allocated bandwidth, during predetermined low consumption periods, the number of movies offered is lower. Consequently, a subscriber has fewer movie or start time choices during low consumption periods.

Obviously, there is a need to manage bandwidth and RF channel allocation more effectively by either allocating bandwidth adaptively according to demand or by employing a scheme in which bandwidth allocation is adapted through time. Therefore, what is needed is a means for bandwidth management that benefits from predetermined subscriber viewing patterns and simultaneously offers capabilities for adaptive scheduling and dynamic bandwidth resource allocation so that the available bandwidth can be allocated between the DTCs and the available content delivery modes (such as pay-per-view and VOD modes, etc.) based, at least in part, on the subscribers' expressed preferences.

Figure 4:
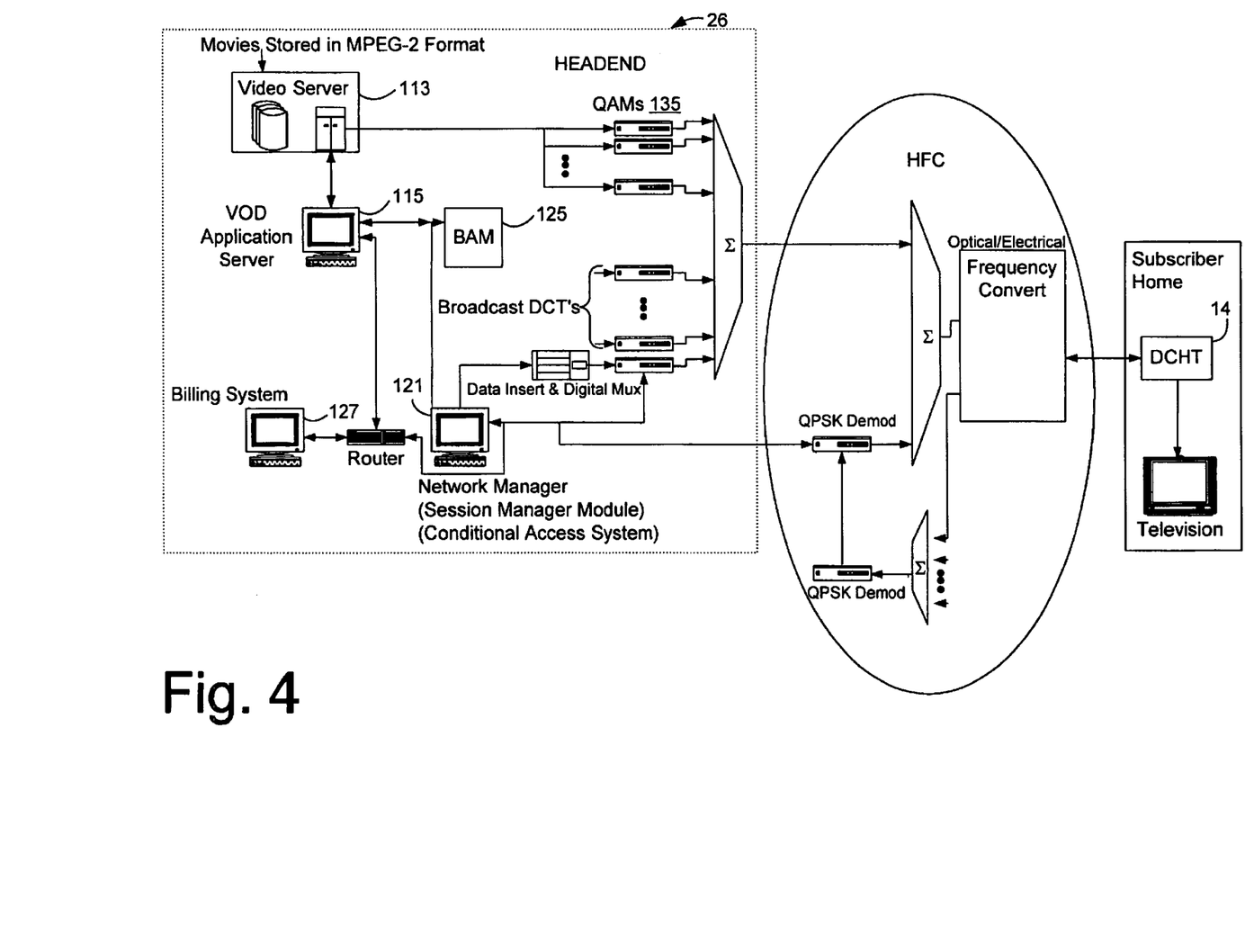
FIG. 4 is a block diagram of an exemplary headend suitable for operation as the headend of FIG. 2, according to one aspect of the present invention.

The present invention fulfills this need using an adaptive bandwidth allocation manager that dynamically allocates available bandwidth between the DTCs based on allocation criteria which comprises at least one subscriber criteria received from a subscriber. Referring now to FIG. 4, there is shown a high-level representation of a headend according to one possible embodiment of the present invention. In this embodiment, the bandwidth allocation manager 125 is located at the headend 26 of the DBDS 10 as shown in FIG. 1. The headend 26 contains a video server 113, a video-on-demand application server 115, a network manager 121, a billing system 127, and the bandwidth allocation manager 125. It should be appreciated that although single components (e.g., video server 113, video-on-demand application server 115, network manager 121, etc.) are illustrated in FIG. 4, a headend 26 can feature a plurality of each of the illustrated components or may be configured with alternative embodiments for any one of the individual components. It should also be appreciated that, although the VOD application server 115, bandwidth allocation manager 125, network manager 121, and billing system 127 are shown as separate components, these components may be combined into one or more components with similar functionality without altering the novel aspects of the present invention.

The video server 113 serves as a repository for storage of video content such as digital movies. Each movie may be represented by a single "normal play" compressed video stream or, alternatively, by multiple streams representing different playback speeds and directions. For example, a single movie may be stored as three separate video streams, one for normal play, one for fast forward and one for reverse. The video content may also comprise content formatted for specific content delivery modes such as VOD or NVOD modes, some of which are described above. The video content is typically transferred from remote content providers 18 as shown in FIG. 1 and stored to the local video server 113 where it can be made available as video streams to the other equipment located within the headend 26.

The VOD application server 115 coordinates the various parts of the system and records transaction and state information in a database. It also communicates with the billing system 127 to insure that subscribers are charged the appropriate rate for any VOD services that may be provided. In addition, the VOD application server 115 manages the loading of video content such as movies or other programs into the video server 113 from content providers and creates a list of available video titles and associated VOD data. Part of the VOD data, such as the VOD Catalogue, may be transmitted to the DHCTs 14. Other parts of VOD data may be reside in the VOD server and be accessible to subscribers on an on-demand basis. For instance, movie previews may be requested by employing the OOB channel to carry the subscriber's request from the DHCT 14 to the VOD application server 115 to view the desired movie preview. The VOD application server 115 also manages a self-contained database and communicates with the network manager 121 to coordinate the delivery of the VOD services from the video server 113 to the DHCT 14. It is also common for the VOD application server 115 to accept commands from a system administrator through an administration graphical user interface (GUI) to set the parameters and configurations of the VOD components throughout the DBDS. The Administration GUI (not shown) enables the system administrators to configure the system and review past activity.

The network manager 121 provides control and communication functionality by monitoring the DHCTs 14 and facilitating messaging between the DHCTs 14 and components within the headend 26. When any of the communication functionality is provided by headend components other than the network manager 121, the network manager 121 indirectly provides similar functionality by providing the control and coordination to those other devices that provide the required communication functionality to enact the services. The network manager 121 also preferably controls the multiplexing of media and data for transmission and reception over the HFC access network 38 and manages the provision of services over the DBDS 10.

The network manager 121 also typically includes a session manager module and a conditional access system. The session manager module uses the MPEG-2 DSM-CC protocol to coordinate on-demand sessions as described in further detail below. The conditional access system communicates with the DHCTs 14 and the billing system 127 to determine whether a particular subscriber is authorized to receive particular content. If a DHCT 14 is not authorized for certain services, the conditional access system insures that such services are not transmitted.

The billing system 127 communicates with the VOD application server 115 and the network manager 121 to calculate and process subscriber fee information. Information pertaining to fees associated with respective VOD services or other services may be stored locally in the memory 112 of the DHCT 14 and displayed for subscriber viewing via the presentation of a graphical user interface. The billing system 127 may also communicate directly with bandwidth allocation manager 125 to provide adaptive billing information.

For billing purposes, in one embodiment, VOD transactions are stored in the flash memory part of system memory 112 or in some other designated non-volatile memory section of DHCT 14 as purchase transactions occur. VOD transaction records and associated fees transmitted upstream via the OOB upstream channel at designated scheduled times (e.g., during low bandwidth consumption periods). Alternatively, the VOD application server may periodically poll individual DHCTs 14 or group of DHCTs to collect their respective VOD transaction history. VOD transaction records received from subscriber's DHCT by VOD application server are debited from subscriber's respective account.

Referring still to FIG. 4, in one embodiment of the present invention, the bandwidth allocation manager 125 is in communication with the VOD application server 115, the network manager 121, and, preferably, the DHCT 14. It will be appreciated by one of ordinary skill in the art, however, that such communication can be established in a number of ways and does not require that there be a direct connection between each of the components. For example, the bandwidth allocation manager 125 may communicate with the VOD application server 115 indirectly by transmitting and receiving information to and from the network manager 121 which then communicates with the VOD application server 115. Similarly, the bandwidth allocation manager 125 may communicate with the DHCT 14 indirectly either through the network manager 121 or through the VOD application server 115. Likewise, any communication can be established with any headend component that interfaces a first VOD component to a second VOD component. The bandwidth allocation manager 125 may receive one or more allocation criteria from any one of the above referenced components in communication with the bandwidth allocation manager.

Allocation criteria may comprise one or more received preference sets input by one or more subscribers. Alternatively, the allocation criteria may comprise input from the DBDS system operator, or input from a subscriber or the system operator. The bandwidth allocation manager 125 uses the allocation criteria to determine a bandwidth allocation schedule that divides the available bandwidth between the different types of DTCs for each period in time.

Numerous allocation criteria may be used to determine a bandwidth allocation schedule. According to one aspect of the invention, the allocation criteria comprises a subscriber criteria. The subscriber criteria may comprise subscriber preferences selected by the subscriber from a series of preference fields presented to the subscriber via a graphical user interface displayed on the display or TV driven by DHCT 14. The subscriber may select particular preferences, or enter additional data, using any of numerous input devices such as a wireless remote-control device or a wired or wireless keyboard. Alternatively, a subscriber may select one a multiplicity of choices displayed for each preference field as displayed and presented in a GUI. The GUI may include data from a VOD catalogue as described above. Example of subscriber preference data may include movie start times, movie titles, the degree of random access functionality (i.e., the amount of control over movie play desired), or a particular fee that the subscriber is willing to pay. If the subscriber is presented with a GUI of subscriber preference fields, the subscriber may also be given the option of "don't care" for one or more of the fields. The subscriber may also be given the option of entering multiple sets of preferences, each containing one or more sets of subscriber preferences. The subscriber may also be given the option to order preference sets according to the subscriber's desired priority. An entry for a preference field may be repeated in one or more, and possibly all, preference sets. For instance, the subscriber may enter the same movie title in all preference sets or the same starting time.

In addition, the subscriber may enter a preferred delivery mode for the movie in a fifth preference field. Since the level of random access functionality is implied by the selected delivery mode, in yet another embodiment, the preference field for the level of random access functionality is replaced with the field for a preferred delivery mode. In another embodiment, the DHCT 14 may include program logic capable of presenting a GUI to subscriber wherein subscriber can eliminate choices that would ordinarily be displayed in respective list for each respective preference field. In this way, a subscriber may, for instance, eliminate undesired delivery modes, undesired start times (such as very late), or undesired high service fees. Subsequently to such interactive configuration sessions, when the subscriber invokes a session to enter his/her viewing preferences for the purchase of a movie service, the GUI presentation does not display the respective eliminated entries for each list associated with a preference field.

According to another aspect of the present invention, the bandwidth allocation manager 125 allocates the available bandwidth based on allocation criteria comprising a subscriber criteria received from a subscriber, such as a request for a VOD service according to one or more subscriber preferences as discussed above. To appreciate the advantages of the present invention, it is useful to first set forth a common method used to fulfill a VOD request. In a typical DBDS, for each VOD request it is necessary to set up a "session" between the DHCT 14 and the video server 113. A session is a logical entity used to define a connection between the DHCT 14 and the video server 113 and the resources used to maintain that connection in the DBDS. The signaling required to implement the session is defined by the MPEG-2 standard's ISO/IEC 13818-6 IS (MPEG-2 DSM-CC). Upon a session setup request generated by the DHCT 14 (usually in response to a request from a subscriber), the network manager 121 verifies the eligibility of the DHCT 14 to receive the VOD service being requested and then passes the request to the VOD application server 115. If the VOD application server 115 determines that it can deliver the service, it communicates with the network manager 121 to reserve the network resources required to deliver the VOD service. The network manager 121 allocates the requested resources, including the necessary bandwidth, and sends a message back to the VOD application server 115 to indicate that the requested resources have been allocated. This message contains MPEG-2 transport stream ID, identifying the physical connection from the video server 113 to the headend 26, and the connectivity from the QAM 135 to the Hub 34 in which the DHCT 14 is connected. The amount of bandwidth that will be reserved for the duration of the VOD session is also communicated. The VOD application server 115 sends a message to the DHCT 14 that indicates that it is ready to begin delivering the video content using the resources allocated. The DHCT 14 receives information in the message identifying the QAM Modulator that is transmitting the video content (and hence where to tune to receive the requested content) and the bandwidth allocated to deliver the service. After a session has been established, the DHCT 14 communicates directly with the VOD application server 115 to facilitate delivery of the requested VOD service. Throughout the course of time that a VOD service is active further messaging is conducted between the respective DHCT 14 receiving the VOD service and the VOD application server 115 to monitor the status of the session. Thus, the VOD server can monitor that a session is properly functioning and determine whether the subscriber has invokes any random access feature of the VOD service.

The procedures for requesting and delivering of a VOD service can be quite complex, especially when there are more requests than there are available VOD bandwidth resources. Advantageously, according to one aspect of invention, the bandwidth allocation manager 125 eliminates some of these problems by dynamically determining bandwidth allocation based on the subscriber criteria. Because the bandwidth is not pre-allocated to certain types of DTCs that transmit content according to predetermined delivery modes, the bandwidth allocation manager can dynamically adjust bandwidth allocation in response to a subscriber criteria. This allows the bandwidth allocation manager 125 to either set up a VOD session according to several well-known methods such as that described above, or to choose an alternative delivery method to broadcast the requested VOD service without necessitating a VOD session. For example, since the bandwidth allocation manager 125 receives the subscriber request prior to determining a bandwidth allocation schedule, the bandwidth allocation manager 125 has the option to fulfill the request using any available bandwidth. Hence, if no or a small number of subscribers have requested a particular movie that is planned to be transmitted according to a pay-per-view model, then the bandwidth allocation manager can "recapture" that bandwidth and allocate it to fulfill a subscriber request during the same time period if it is to result in a more financially advantageous bandwidth allocation. Additionally, when a movie is paused or stopped for a significant period of time, the VOD application server 115 may communicate to the network manager 121 and/or the bandwidth allocation manager 125 that the bandwidth allocated to the respective DHCT 14 consuming the VOD service may be reallocated. The bandwidth allocation manager may also aggregate multiple subscriber requests for the same VOD service that are received at approximately the same time. Instead of allocating bandwidth to fulfill each subscriber request, the bandwidth allocation manager 125 may instead choose to fulfill the subscriber requests by delivering the requested VOD service according to an alternative delivery mode such as broadcasting the requested service according to one of the NVOD models described above. Hence, the bandwidth allocation manager 125 uses the subscriber criteria received from a subscriber to determine the bandwidth allocation schedule.

In another aspect of the invention, the bandwidth allocation manager 125 determines a bandwidth allocation schedule (and thus allocates the available bandwidth) based on allocation criteria comprising a subscriber reservation request. The subscriber reservation request is a request initiated by the subscriber to view a particular service at a particular time in the future. According to this aspect of the invention, the DHCT 14 includes a VOD reservation application that allows a user to select video content from a catalog of available services and to select the date and time that they wish to view the video. The VOD reservation application may comprise software loaded onto existing DHCT messaging utilities, or additional hardware programmed to provide the requisite functionality. Providing the DHCT 14 with a list of available video content and reservation times can be done in a similar fashion to providing data for an EPG service. Typically, the list of available content is compiled by the VOD application server 115 and transferred to the DHCT 14 either automatically or upon transmittal of a request by the DHCT 14. A VOD Catalogue of movie titles is presented to the subscriber through an easy-to-use graphical user interface. For example, the GUI may comprise a series of fields similar to that described above with regard to the subscriber preference fields.

In one embodiment of the present invention, after selecting the date and time of the reservation request, the subscriber enters input via an input device, such as infrared remote control device, that instigates the DHCT 14 to transmit a message to the network manager 121 requesting that the network manager 121 reserve the necessary resources to transmit the video content at the requested time. This messaging can be accomplished using communication capabilities facilitated by the two-way DBDS network and the two-way capable DHCT 14. Alternatively, in a one-way network, DHCT 14 can communicate data to the headend via a telephone modem. The network manager 121 then communicates the subscriber reservation request to the bandwidth allocation manager 125. It will be appreciated that the bandwidth allocation manager 125 may be configured so as to communicate directly with the DHCT 14, thus eliminating the need for the message to be passed through the network manager 121. After the subscriber reservation request is received by the bandwidth allocation manager 125, it is stored by the bandwidth allocation manager 125 until such time as the bandwidth allocation manager 125 initiates a bandwidth allocation event. Alternatively, the reservation request may be stored in the network manager 121 and retrieved by the bandwidth allocation manager 125 when it begins a bandwidth allocation event.

The bandwidth allocation event is the process initiated by the bandwidth allocation manager 125 wherein the bandwidth allocation manager collects the stored allocation criteria, including any subscriber criteria such as VOD service requests and any subscriber reservation requests, and processes these criteria to determine a bandwidth allocation schedule. A residual amount of bandwidth may be allocated to accommodate last minute viewing requests for subscribers that wish to pay a considerably higher service fee. Advantageously, the bandwidth allocation manager 125 does not need to pre-allocate a fixed amount of bandwidth to particular types of DTCs or to particular content delivery modes prior to determining an optimal bandwidth allocation and delivery mode for a particular time period. Instead, the bandwidth allocation manager 125 can utilize and adapt the amount of bandwidth for delivering VOD services or other on-demand services. Alternatively, the cable operator may choose to assign a predetermined amount of bandwidth to be allocated by the bandwidth allocation manager based on the allocation criteria.

Hence, video content can be transmitted using any of several well-known content delivery mode such as pay-per-view, NVOD, or VOD, or any combination thereof, depending on the resources available at a particular time. If the subscriber reservation reserves video content during an off-peak period where bandwidth is readily available, the bandwidth allocation manager 125 may communicate with the network manager and the VOD application server 115 to initiate a true VOD session at the time of the subscribers reservation. On the other hand, if demand is high for a particular time period, the bandwidth allocation manager 125 may explore other content delivery options to fulfill the subscriber requests more efficiently.

According to yet another aspect of the present invention, the bandwidth allocation manager 125 may also comprise means to transmit a message to subscribers notifying them that their reservation request has been fulfilled. The bandwidth allocation manager 125 may communicate directly with the subscriber's DHCT 14, or it may transmit the message to the network manager 121 which passes the message to the DHCT 14. Alternatively, the subscriber can place a phone call and navigate through a phone-activated menu in which he/she enters personal information and assigned identification to learn the status of his request. Alternatively, the subscriber can employ a computer connected to the internet or DHCT 14 to use an internet browser or similar internet navigation tool to log on to a secured web site, enter a user identification and password, and learn the status of his/her request. Thus, this messaging can be accomplished using any of several methods well known in the art.

In the event that a particular subscriber reservation request is not or cannot be fulfilled by the bandwidth allocation schedule determined by the bandwidth allocation manager 125, the bandwidth allocation manager 125 may send a message to the subscriber notifying them that their reservation could not be fulfilled. The message may also include information on other options available to the subscriber as described in detail below.

According to another embodiment of the present invention, the bandwidth allocation manager 125 may determine the bandwidth allocation schedule based on a combination of multiple allocation criteria such as a predetermined statistical model or an adaptive statistical model that continually evolves based on changes in allocation criteria. In this embodiment, the allocation criteria may comprise subscriber criteria (e.g. VOD requests, subscriber reservation requests, and subscriber profile data) and allocation criteria received from other sources such as subscriber billing information, content delivery mode information, program content information (such as a program's prior success), and priority data associated with the subscriber. The priority data associated with the subscriber may comprise information that gives the requests of one subscriber priority over the requests of another subscriber such that certain subscriber requests are given preference over others based on assigned priority data. The assigned priority data may be used to provide subscriber incentives or to reward subscribers for frequent purchases, etc. It will be appreciated that the above list of possible allocation criteria is merely illustrative and that numerous other allocation criteria may be considered in determining the bandwidth allocation schedule. Advantageously, the bandwidth allocation manager 125 may receive these allocation criteria from any of a number of sources. For example, the DHCT 14 may include logic means to store subscriber profile data that includes information about the subscribers past viewing patterns.

In a preferred embodiment, the bandwidth allocation manager processes the allocation criteria according to a statistical model that is designed to result in a bandwidth allocation suitable for a particular goal. The statistical model may assign different weights to different allocation criteria in order to emphasize the impact a specific criteria has on the bandwidth allocation schedule. The statistical model can be predetermined to produce a particular result such as maximizing the total number of subscriber requests fulfilled (such as requests for VOD access and pay-per-view access) or maximizing the revenue generated from the available bandwidth. For example, if the bandwidth allocation manager 125 receives a large number of requests for particular video content such as a popular movie to be transmitted at approximately the same time, the bandwidth allocation manager 125 may allocate several channels to broadcast that content according to an NVOD delivery model so that the most highly requested video content is available without necessitating initiation of a VOD session. The bandwidth allocation manager 125 may also provide the ability to broadcast the video content in progressively non-decreasing staggered start times or non-linear time-spaced intervals so that a greater number of subscriber requests can be fulfilled.

For example., if fifty percent of the subscriber reservations request delivery of particular video content at approximately 8:00 and the other fifty percent request video content at approximately 8:45, the bandwidth allocation manager 125 may broadcast the content over several channels at predetermined intervals of varying length to not only comply with the subscriber requests, but also to comply with normal subscriber viewing patterns. Thus, in the above example, the bandwidth allocation manager 125 may elect to broadcast the video content at 7:58, 8:00, 8:01, 8:03, and 8:07 and then again at 8:40, 8:45, and 8:48. These intervals may be chosen based on the subscriber reservation requests and, optionally, prior subscriber viewing patterns. The subscriber, in most cases, will not even be aware that they are sharing their reserved viewing times with other subscribers. Advantageously, the bandwidth allocation manager provides the ability to broadcast the video content in an efficient manner that frees bandwidth previously allocated but unused and allows more subscribers to purchase a movie and reduces the likelihood of not granting service to subscribers wishing to view a movie.

The statistical model used by the bandwidth allocation manager to determine the bandwidth allocation schedule may also be predetermined based on human or machine analysis of the bandwidth consumption (or request from bandwidth) history of a significant number of subscribers over a significant period of time. The analysis of bandwidth consumption history may also comprise analysis of the bandwidth usage pattern according to the respective day of week, time of day, time of year, proximity of time to holidays, and other time events. The predetermined model may also take into account demographics and geographic characteristics.

Alternatively, the statistical model may be non-static and evolve over time as new allocation criteria are collected and analyzed. In this embodiment, the bandwidth allocation manager or some other associated device comprises means for gathering and storing allocation criteria and continually analyzing the stored data. Thus, as new allocation criteria are collected, stored and analyzed, the statistical model continues to evolve and update its statistics at preset intervals such as weekly, daily, monthly etc. This embodiment may also comprise real-time statistical analysis capabilities wherein the statistical model continues to dynamically evolve, on a real-time basis by monitoring and detecting when any significant change in bandwidth demand or when any different bandwidth consumption pattern merits a revision of the statistical model.

Advantageously, the present invention provides extraordinary flexibility in allocating finite bandwidth. It is important to note, however, that the bandwidth allocation manager 125 serves a dual purpose. First, it allows bandwidth to be pre-scheduled based on, among other things, subscriber criteria. Second, it provides a means for dynamically managing bandwidth resources on a real-time basis by adaptively invoking in parallel one or more of a multiplicity of bandwidth allocation schemes for granting movie viewing and on-demand services, while informing subscribers to accept a level of compromise as imposed by sharing bandwidth allocation over not receiving a service at all. For instance, in the event that the bandwidth allocation manager determines that a particular subscriber reservation request cannot be fulfilled (such as when there is insufficient available bandwidth), the bandwidth allocation manager may provide the subscriber the option of viewing the movie at a different time. Alternatively, a subscriber may be asked to accept an NVOD delivery model with reduced random-access functionality. Or a subscriber may be asked to delay or wait a certain period of time until the requested movie viewing can commence to capture a larger number of subscribers that have requested to view the same movie at approximately the same time.

Numerous unique combinations of content delivery may be adaptively employed to better allocate finite bandwidth resources. The following paragraphs detail several unique examples of the various bandwidth allocation schedules that may be adaptively and dynamically employed. According to one possible bandwidth allocation schedule, multiple instances of a popular program may be broadcast to efficiently use available bandwidth resources by controlling the plurality of starting times in a non-staggered manner by employing a scheduling method based on the two different repetition aspects. First, the movie is repeatedly broadcast with start times spread out at longer time intervals. For instance, equal longer time intervals (e.g., 30 minutes or hour increments, or a combination of both) may demarcate the starting-time repetition of the movie. Secondly, the repetition rate of the movie's starting time between the longer time intervals is conducted at progressively non-decreasing time-spaced intervals. Thus, instead of equally-spaced smaller time intervals, the smaller intervals within the time window enveloped by the longer intervals progress in their time separation and thus emulate a non-linear progression rate. The re-broadcast of a movie at non-linear non-decreasing time intervals ceases when a start time matches or surpasses the recurring start time of the movie scheduled with the next start time demarcated by the longer time interval.

Another possible allocation schedule may employ a non-linear progression rate with start times that double the time separation between the two previous start times. Yet another possible alternative is for the non-linear progression of the movie's start time may also be selected to be proportionate to the duration of time that a typical individual consumes to perform any of a multiplicity of personal activities that instigates the pausing or stopping of the movie play or the time to perform ordinary random-access operations (reverse and re-play operations). Such duration of times or personal activities are gathered from statistical data on a large number of consumers and may represent activities such as: answering a phone call; attending door bell; microwaving popcorn; restroom breaks, and personal hygiene.

According to another possible allocation schedule, bandwidth for movie viewing and on-demand services is managed according to a series of recurring sub-schedules consisting of a multiplicity of non-overlapping time intervals. Preferably, the time intervals vary in length and are established with demarcation according to collected historical data of subscriber consumption patterns of on-demand services. Hence, bandwidth for movie viewing and on-demand services may be configured to adapt in a time-specific manner according to a plan. The system bandwidth allocated for movie viewing and on-demand services is configured to switch as time progresses from a first allocation sub-schedule to a second allocation sub-schedule according to a main schedule that specifies the time interval when each of two or more sub-schedules is to be active. In this embodiment, only one configurable sub-schedule is active at a time throughout the configurable recurring schedule but a first configurable sub-schedule may be active throughout one or more distinct and non-overlapping time intervals of the configurable recurring schedule. The recurrence of the schedule is configured to one of a multiplicity of time periods such as a weekly, daily, or a monthly recurring schedule.

According to another possible bandwidth allocation schedule, a multiplicity of time-adaptive schedules for each of a multiplicity of recurring schedule choices are pre-configured. In this embodiment, the cable system operator may monitor the bandwidth and on-demand service usage and be given the option of manually implementing one of the pre-configured allocation schedules without following a plan. Alternatively, the network manager 121 may automatically monitor bandwidth usage and on-demand service usage and the bandwidth allocation manager 125 may communicate with the network manager 121 and the VOD application server 115 to automatically select one of the pre-configured schedules. For instance, six different configurations may be available for time-adaptive management of the bandwidth allocated for movie viewing and on-demand services for a daily recurring schedule. On the other hand, more than six different arrangements may be necessary when implementing time-adaptive bandwidth management on a weekly recurring schedule.

According to another possible allocation schedule, several recurring sub-schedules may be utilized whereby on-demand services are offered with unrestricted random access functionality for one or more specific time intervals (e.g., 9:30 AM to 5:00 P.M. and/or 12:00 to 4:30 AM; during weekdays) when bandwidth for on-demand services is projected to be low according to collected historical data of subscriber consumption patterns. During peak periods, such as 5:00 to 11:59 PM of the week nights, bandwidth allocation schedule may comprise an NVOD service featured with progressively non-decreasing staggered start times (as described in summary section herein) with a total number of channels that is less than the total number of requests for the same video on-demand service. A more restrictive form of random access features is provided with the NVOD service. During weekends, the band-width allocation schedule may be determined such that full random access functionality is only available during certain, low-demand time periods such as 6:00 to 11:00 AM.

The bandwidth allocation schedule may also employ a small number of auxiliary channels, aggregated to support full random access functionality during a parallel NVOD service. Thus a set of channels may be assigned for on-demand random access functionality in parallel with the NVOD service featured with progressively non-decreasing staggered start times. Because the activation of random access functionality by any subscriber tends to be for significantly shorter time intervals than for normal playback, bandwidth consumption for random access functionality is relatively small and a small number of auxiliary channels to support on-demand random access functionality are typically sufficient.

According to another possible bandwidth allocation schedule and another aspect of the present invention, the Cable Operator may assess a fee per time usage of the auxiliary channel bandwidth in much the same way as telephone companies charge for long distance telephone usage. Consequently, the subscriber consumes bandwidth for on-demand random access functionality fully aware that he/she is incurring a cost associated with the time that random access functionality is utilized or according to some other parameter. If on-demand random access functionality is not available instantaneously, the projected delay to provide the bandwidth necessary for the requested random-access feature is typically minimal. To fill the delay, the bandwidth allocation manager 125 or DHCT 14 may cause a temporary graphical or textual barker that indicates that the requested operation is in progress. In such way, the delay will appear shorter since the subscriber focuses attention to the displayed barker. The displayed barker may also display an input device (such as a remote control) key or button with instructions to press such key or button in the input device to cancel the requested on-demand random access operation. Furthermore, such key or button with associated canceling instructions may not be displayed at all unless the delay is significantly longer than expected.

Alternatively, the bandwidth allocation manager may act in conjunction with the VOD server and the DHCT 14 to simulate on-demand or random access features transparently by periodically comparing the time shifts between a plurality of broadcast versions of the movie (as determined by the bandwidth allocation schedule). For example, if a subscriber order a program with Pause functionality and pauses the program, the bandwidth allocation manager may elect to recapture the unused bandwidth. When the user restarts the program, pausing functionality may be simulated by locating another broadcast or NVOD version of the program with a later start time that has reached a point in the program approximately equal to the point where the subscriber paused the program. If the subscriber purchases the program according to a content delivery mode that utilizes auxiliary channels, the subscriber may not incur the additional associated fee since auxiliary channel bandwidth was not utilized.

Alternatively, when a subscriber consumes on-demand random access functionality with bandwidth assigned via an auxiliary channel dedicated for on-demand random access, the subscriber has complete freedom to invoke random access functionality by activating respective dedicated keys or buttons in the input device (such as a wireless remote control device or a wired or wireless keyboard). Upon a bandwidth grant for on-demand random access functionality, the subscriber can initiate the process of reviewing a past portion of the movie by pressing a first key (or button) to play the movie in reverse playback mode, press a second key to pause the reverse playback mode, press a third key to replay the movie in normal play mode from the point that the reverse playback was paused, and to press a fourth key to play the movie in fast forward mode from the point wherein subscriber wishes not to replay the movie in normal play mode. Once the subscriber commences fast forward mode, the subscriber can pause the fast forward operation at the point he/she left off (or at any point he/she wishes) to restart normal play mode. At this point, the program logic such as the VOD application on-demand executing in DHCT 14 and/or program logic contained on the bandwidth allocation manager may compare the time shifts between the plurality of broadcast version of the movie (according to the NVOD delivery mode with staggered start times) and the point of the movie wherein normal play is to resumed. If the program logic (located at either the DHCT 14 or the bandwidth allocation manager) determines that it is feasible to connect this subscriber to a broadcast version of the movie without significant delay, it does. Consequently, the subscriber does not consume auxiliary channel bandwidth any longer, and at that point in time the subscriber ceases from incurring the additional associated fee with on-demand random access. Alternatively, the subscriber continues to consume the bandwidth of the auxiliary channel and the additional associated fee. If the software application determines that significant delay will be experienced to connect the subscriber's DHCT 14 to the broadcast version of the movie where the normal play mode is to resume, the program logic may query the subscriber via a graphical user interface (GUI) to select either to wait for the estimated amount of time or to incur additional dedicated bandwidth granted via one of the auxiliary channels.

Random access functionality may also be assisted with a GUI whereby common keys of the input device are employed (e.g., arrow keys) to control cursor position and a separate "select or "enter" key is used to activate the respective random access key displayed with a graphical representation.

In one embodiment, a small graphical representation in a corner of the TV driven by DHCT 14, displays the running time pertaining to the consumption of bandwidth for on-demand random access and/or the additional associated fee. In this way the subscriber has visual feedback of how his/her on-demand random access consumption and the associated additional incurred expense.

The number of auxiliary channels to support on-demand random access functionality may be determined by the bandwidth allocation manager by employing an active statistical model that represents collected historical data of subscribers' bandwidth usage patterns for the different delivery modes and usage patterns for on-demand random access functionality as is described above.

In an alternate embodiment, the bandwidth allocation schedule may comprises one or more different types of a hybrid of content delivery modes featured in parallel, each type of service consuming a respective part of the total allocated bandwidth during a particular time interval. Hence, during one or more time intervals, the total bandwidth allocated for video services may be divided with a first part appropriated for on-demand services with full random access functionality, a second part appropriated for NVOD services featured with progressively non-decreasing staggered start times with auxiliary channels to support on-demand random access, and a third part for NVOD services featured with progressively non-decreasing staggered start times but with restrictive random access support (that is, with pause and replay support only). Alternatively, during one or more time intervals, only one of a plurality of different types of video services may be offered thereby consuming the total bandwidth allocated for video services in whole. Similarly, during one or more time intervals, any combination of the plurality of different video services may be configured to run in parallel.

According to another aspect of the invention, the bandwidth allocation manager 125 communicates with the network manager 121 to allocate the predetermined bandwidth according to the bandwidth allocation schedule determined by the bandwidth allocation manager. This may be accomplished by transmitting the bandwidth allocation schedule to the network manager after each bandwidth allocation event. Thus, the bandwidth allocation manager may continually communicate with the network manager to dynamically allocate bandwidth according to each new bandwidth allocation schedule. Bandwidth allocation entails an assignment of system resources for a time interval for delivering a video service requested by a subscriber according to the bandwidth allocation schedule. A time interval is characterized by a specific start time and duration.

Many modifications and other embodiments of the invention will come to mind to one skilled in the art to which this invention pertains having the benefit of the teachings presented in the foregoing descriptions and the associated drawings. Therefor, it is to be understood that the invention is not limited to the specific embodiments disclosed and that modifications and other embodiments are intended to be included within the scope of the appended claims. Although specific terms are employed herein, they are used in a generic and descriptive sense only and not for purpose of limitation.

That which is claimed:

1. A method implemented by a programmable network manager coupled to at least one server and at least one television set-top terminal (STT) via a bi-directional communication network, the method comprising the steps of:

allocating a first amount of network bandwidth equivalent to the amount of bandwidth required to transmit concurrently a first set of broadcast transmissions of at least one video program for the duration of a first time interval with a first start interval time and a first end interval time;

allocating a second amount of network bandwidth equivalent to the amount of bandwidth required to transmit concurrently a second set of broadcast transmissions of at least one video program for the duration of the first time interval;

transmitting a first broadcast transmission of the first video program over the first amount of network bandwidth during the first time interval;

transmitting a second broadcast transmission of the first video program over the first amount of network bandwidth during the first time interval, the start time of the second broadcast transmission delayed from the start time of the first broadcast transmission;

configuring the second amount of network bandwidth for the duration of the first time interval exclusively for at least one dedicated transmission of any portion of the at least one video program from the at least one server to the at least one STT;

providing the first and second broadcast transmissions of the first video program to a first STT and a second STT during the first time interval;

receiving a viewer input from the first STT during the first time interval, the viewer input being configured to select a dedicated transmission of the first video program to the first STT; and responsive to receiving the viewer input, establishing a first dedicated network session between the at least one server and the first STT and providing a dedicated transmission of the first video program to the first STT over a transmission channel in the second amount of network bandwidth for the duration of a second time interval with a second start interval time and a second end interval time.

2. The method of claim 1, wherein providing the dedicated transmission of the first video program comprises a different playback mode of the first video program.

3. The method of claim 1, wherein providing the dedicated transmission of the first video program comprises a different formatted version of the first video program.

4. The method of claim 1, wherein the first video program is provided to the first STT via a tuner in the first STT.

5. The method of claim 1, wherein providing the dedicated transmission of the first video program during the second time interval corresponds to the duration of a presentation of a different playback mode of the first video program.

6. The method of claim 1, wherein the second start interval time is after the first start interval time.

7. The method of claim 1, wherein the second amount of network bandwidth is smaller than the first amount of network bandwidth.

8. The method of claim 7, wherein the first end interval time is after the second end interval time.

9. The method of claim 1, wherein the start time of the first broadcast transmission over the first amount of network bandwidth is substantially equal to the first start interval time.

10. The method of claim 1, wherein a third time interval with a third start interval time substantially equal to the first end interval time and a third end interval time immediately follows the first time interval, wherein the configuration of the second amount of network bandwidth for the duration of the third time interval is different than the configuration for the duration of the first time interval.

11. A method implemented by a programmable network manager coupled to at least one server and at least one television-set-top terminal (STT) via a bi-directional communication network, the method comprising the steps of:

enabling a first delivery mode and a second delivery mode of a first video program to the at least one STT for the duration of a first time interval with a first start interval time and a first end interval time;

configuring the first delivery mode as a first broadcast transmission of the first video program to the at least one STT for the duration of the first time interval;

configuring the second delivery mode of the first video program as a dedicated transmission from the at least one server to a respective at least one STT for the duration of the first time interval;

configuring the at least one STT to receive the first video program during the first time interval;

receiving a first input from a first STT at a first input time, the first input being configured to request delivery of a first video program during the first time interval with a first level of random access functionality, where the first level of random access functionality is configured to operate in the second delivery mode;

responsive to receiving the first input, providing the first video program to the first STT during the first time interval via the first delivery mode;

receiving a second input from the first STT during the first time interval, the second input being configured to select a different playback mode of the first video program; and responsive to receiving the second input, establishing a dedicated network session between the at least one server and the first STT and providing the different playback mode of at least a portion of the first video program to the first STT via the second delivery mode for the duration of a second time interval with a second start interval time and a second end interval time.

12. The method of claim 11, wherein the first video program is also provided to a second STT in the first delivery mode during at least a portion of the first time interval.

13. The method of claim 11, wherein responsive to receiving a third input from the first STT for normal playback of the first video program, terminating the dedicated network session between the at least one server and the first STT.

14. The method of claim 11, wherein responsive to receiving a third input from the first STT, providing a normal playback mode of the first video program to the first STT in the second delivery mode.

15. The method of claim 11, wherein responsive to receiving a third input from the first STT for normal playback of the first video program, providing the first video program to the first STT in the first delivery mode.

16. The method of claim 11, wherein the first start interval time is after first put time.

17. The method of claim 11, wherein the first input time is during the first time interval.

* * * * *